United States Patent
Tukawaki et al.

(10) Patent No.: US 7,150,936 B2
(45) Date of Patent: Dec. 19, 2006

(54) SEALED BATTERY AND METHOD FOR MANUFACTURING SEALED BATTERY

(75) Inventors: Kazuyuki Tukawaki, Utsunomiya (JP); Kiyohide Takimoto, Utsunomiya (JP); Hiroyuki Mizuno, Utsunomiya (JP); Yuichi Maekawa, Utsunomiya (JP)

(73) Assignee: NEC Tokin Tochigi, Ltd., Utsunomiya (JP)

( * ) Notice: Subject to any disclaimer, the term of this patent is extended or adjusted under 35 U.S.C. 154(b) by 286 days.

(21) Appl. No.: 10/440,107

(22) Filed: May 19, 2003

(65) Prior Publication Data
US 2003/0207169 A1    Nov. 6, 2003

Related U.S. Application Data

(62) Division of application No. 09/695,278, filed on Oct. 25, 2000, now Pat. No. 6,593,026.

(51) Int. Cl.
*H01M 10/48*    (2006.01)
(52) U.S. Cl. .............................. 429/90; 429/92; 429/93
(58) Field of Classification Search .......... 429/74–75, 429/48, 61, 90, 92–93, 623.1, 623.2; 29/623.1, 29/623.2
See application file for complete search history.

(56) References Cited

U.S. PATENT DOCUMENTS

| | | | |
|---|---|---|---|
| 5,606,114 A * | 2/1997 | Palmer | 73/49.3 |
| 5,645,953 A | 7/1997 | Kim et al. | 429/48 |
| 5,663,007 A * | 9/1997 | Ikoma et al. | 429/53 |
| 6,387,561 B1 | 5/2002 | Nemoto et al. | 429/51 |

* cited by examiner

*Primary Examiner*—Michael Barr
*Assistant Examiner*—Monique Wills
(74) *Attorney, Agent, or Firm*—Westerman, Hattori, Daniels & Adrian, LLP

(57) ABSTRACT

The present invention provides a sealed battery, in which leakage can be detected in reliable manner, a method for manufacturing the sealed battery, and a method for detecting leakage of the sealed battery. The invention provides a sealed battery containing helium, a method for manufacturing the sealed battery, and a method for detecting leakage. From inside a battery case sealed except an electrolyte inlet, the air is withdrawn, and pressure is applied by a gas containing helium under pressure higher than the atmospheric pressure through the electrolyte inlet. The electrolyte is injected, and after the electrolyte and the gas containing helium have been injected, the electrolyte inlet is sealed.

5 Claims, 7 Drawing Sheets

SEALED BATTERY AND METHOD FOR MANUFACTURING SEALED BATTERY

CROSS REFERENCE TO RELATED APPLICATION

This application is a division of Ser. No. 09/695,278, filed Oct. 25, 2000 now U.S. Pat. No. 6,593,026.

BACKGROUND OF THE INVENTION

The present invention relates to a sealed battery, in which the leaking of electrolyte can be checked, and in particular, to a lithium ion battery, in which leaking can be checked at high sensitivity and in reliable manner.

In a sealed battery such as lithium ion battery, a battery element is placed in a battery case, and a header with an external connection terminal, a safety valve, an electrolyte inlet, etc. is attached on the battery case by welding. Then, the battery case is sealed except the electrolyte inlet, and after the electrolyte is injected, a sealing piece is attached on the electrolyte inlet, and the inlet is sealed by laser welding.

During the manufacture of the sealed battery, defects may occur such as welding defect caused in the sealing process of the inlet or defective caulking on the external connection terminal mounted via an insulating member. As a result, the electrolyte may leak or moisture in external air may be introduced into the battery. In the sealed battery with defective sealing, problems may arise such as damage of devices due to leakage of the electrolyte as the performance characteristics of the battery are deteriorated.

In this respect, leakage is checked with the purpose of preventing the shipment of the battery with defective sealing. It has been generally practiced to perform external inspection by visually checking the battery charged after sealing and by confirming stains or the like on the surface caused by the leakage of the electrolyte.

However, in the checking method based on visual inspection, there may be variations due to individual difference of the inspectors. When there is very small sealing defect, it is very difficult to detect a battery with such small sealing defect because the time for inspection is limited at the time of shipment and because the leaking amount is very small.

In this connection, a method for airtightness test using an airtightness tester not depending on human vision has been proposed. For example, a method is proposed in JP-A-9-115555. According to this method, the battery to be tested is accommodated in a sealed container, and gas pressure inside is reduced and pressure change in the sealed container is measured. By this method based on the pressure change, it is not possible to detect the battery with leakage accurately within short time.

According to JP-A-4-25738, an airtightness tester is described. In this tester, after a top cover is mounted on a battery chamber in the assembling process of the battery, hydrogen is introduced under pressure into the battery chamber, and leaking hydrogen is detected by a semiconductor gas sensor. In this method, it is not that leakage is tested in a completed sealed battery with the electrolyte injected in it. Also, an explosive gas such as hydrogen is used, and this leads to a problem of endangering safety.

JP-A-11-307136 describes an airtightness tester. In this tester, after a top cover is attached on a battery chamber, a cover is mounted to enclose junction of the battery chamber and the top cover. Then, helium is introduced into the battery chamber. The air in the cover is sucked and airtightness is judged by detecting helium in the sucked air. This is based on the test of the junction between the battery chamber and the top cover in the manufacturing process, and it is not a leakage test of a completed sealed battery with the electrolyte injected in it.

It is an object of the present invention to provide a sealed battery, by which it is possible to reliably detect defective sealing point of a sealed battery. It is another object of the invention to provide a method for manufacturing a sealed battery, by which it is possible to completely prevent the shipment of the battery with defective sealing.

SUMMARY OF THE INVENTION

The present invention provides a sealed battery, which comprises rare gas therein.

Further, the present invention provides the sealed battery as described above, wherein the rare gas is helium.

Also, the present invention provides a method for manufacturing a sealed battery, wherein said method comprises the steps of exhausting the air in a sealed battery case sealed except an electrolyte inlet, applying pressure on an electrolyte to be injected through the electrolyte inlet by a gas containing rare gas under pressure higher than the atmospheric air, injecting the electrolyte and the gas containing rare gas, and sealing the electrolyte inlet.

Further, the present invention provides a method for manufacturing a sealed battery, wherein there is provided pressurizing means for preventing deformation of the battery case by applying pressure on wall surfaces of the battery case when the gas containing rare gas is supplied.

Also, the present invention provides a method for manufacturing the sealed battery as described above, wherein the rare gas is helium.

Further, the present invention provides a method for detecting leakage in a sealed battery, wherein leakage is detected by determining concentration of rare gas by a rare gas leakage detector in the sealed battery containing rare gas.

Also, the present invention provides a method for detecting leakage in a sealed battery as described above, wherein the sealed battery is accommodated in a sealed container, and leakage is detected by determining concentration of rare gas under the condition that pressure is reduced in the sealed container.

Further, the present invention provides a method for detecting leakage in a sealed battery as described above, wherein said method comprises the steps of accommodating the sealed battery in a detection chamber on a leakage detection tray where a plurality of detection chambers are provided, placing a leakage detection head connected to a leakage detector airtightly in each of the detection chambers, and measuring concentration of rare gas leaking from the sealed battery.

Also, the present invention provides a method for detecting leakage in the sealed battery as described above, wherein the rare gas is helium.

DESCRIPTION OF THE PREFERRED EMBODIMENT

According to the present invention, a sealed battery containing helium is produced by filling helium in a sealed battery in an assembling process, and then by sealing it. The concentration of helium leaking from the sealed battery is detected by a helium leakage detector, and it is possible to find out a sealed battery with defective sealing in reliable manner.

Figure 1:
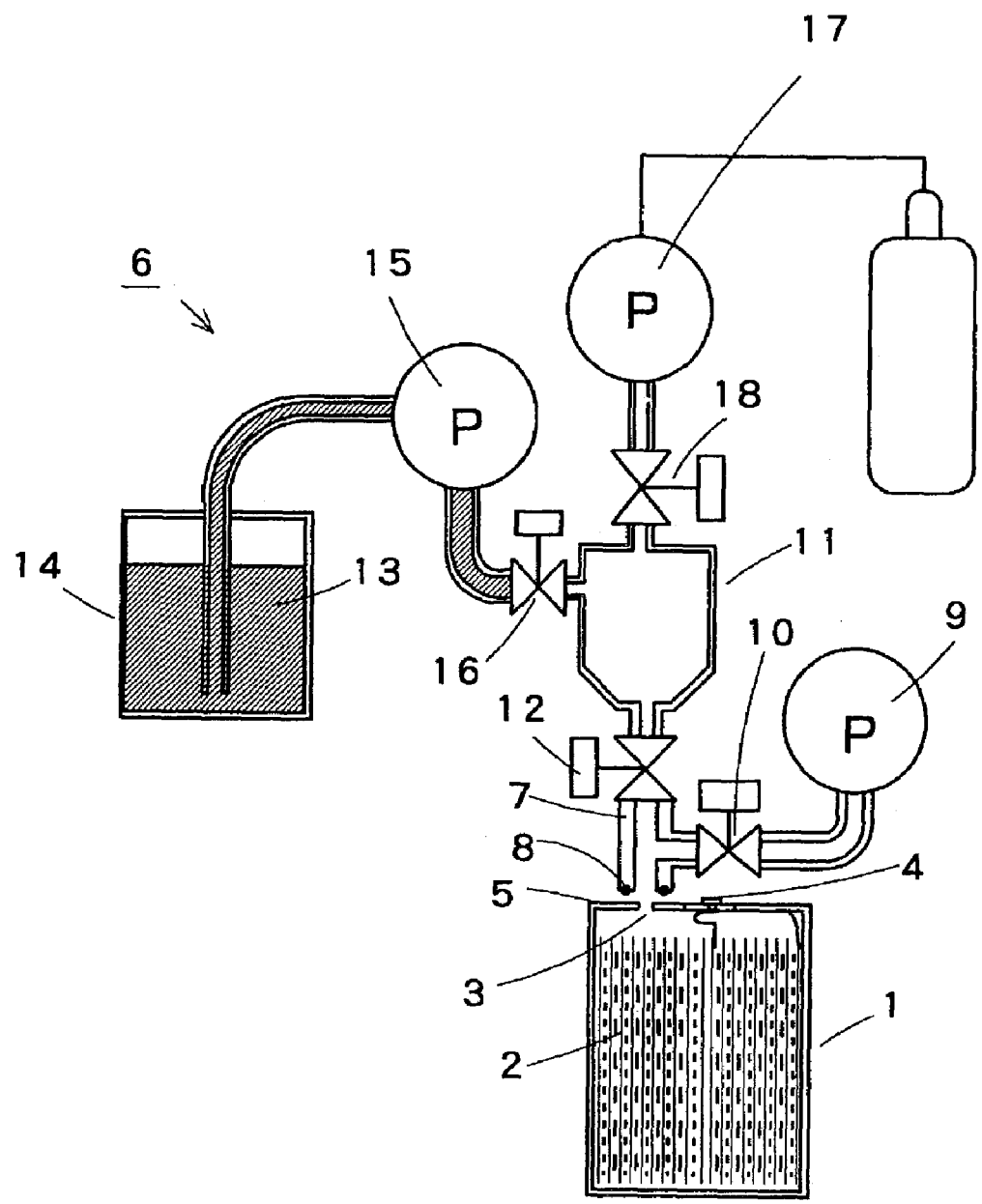
FIG. 1 is a drawing to explain a process for manufacturing a sealed battery of the present invention and also to explain an apparatus for injection electrolyte and helium into a battery case.

FIG. 1 is a drawing to explain a process to produce a sealed battery according to the present invention, and also to explain an apparatus for injecting electrolyte and helium into a battery case.

A battery element 2 is accommodated in a battery case 1. On a top opening of the battery case 1, a top cover 5 is attached by means such as laser welding, and the top cover 5 comprises an electrolyte inlet 3, an external electrode leading terminal 4, and a pressure relief valve and the like for preventing rupture of the battery when pressure inside the battery is increased. An injection nozzle 7 of an electrolyte injection apparatus 6 is attached to the electrolyte inlet 3 on the top cover 5. The injection nozzle 7 comprises airtightness maintaining means such as an O-ring 8 with the purpose of maintaining airtightness when the nozzle is pressed against wall surface of the top cover.

The electrolyte injection apparatus 6 comprises exhaust means 9 for exhausting the air inside the battery case, and an exhaust valve 10 for connecting the injection nozzle 7 with the exhaust means 9.

To the injection nozzle 7, an electrolyte pot 11 for retaining a given amount of electrolyte is connected via an electrolyte injection valve 12. To the electrolyte pot 11, electrolyte feeding means 15 connected with storage means 14 for storing an electrolyte 13 is connected via an electrolyte feeding valve 16.

Also, helium feeding means 17 is connected to the electrolyte pot 11 via a pressure valve 18.

Figure 2:
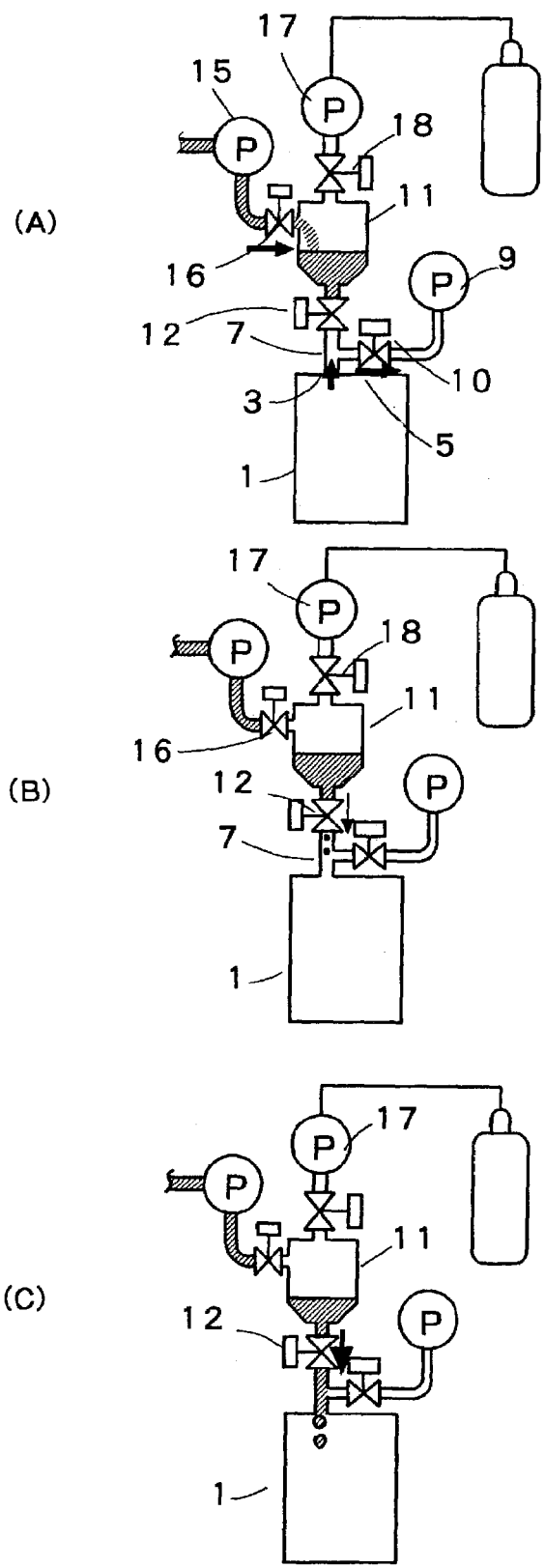
FIG. 2 (a)–(c) shows drawing to sequentially explain the operation of the apparatus for injecting electrolyte and helium according to the present invention.

FIG. 2 shows drawings to sequentially explain the operation of an apparatus for injecting the electrolyte and helium according to the present invention.

As shown in FIG. 2(A), a battery element is accommodated in a battery case 1. On a top opening of the battery case 1, a top cover 5 with the electrolyte inlet 3 is attached by means such as laser welding. The injection nozzle 7 of the electrolyte injection apparatus 6 is airtightly attached to the electrolyte inlet 3. Then, the exhaust means 9 is operated, and an exhaust valve 10 for connecting the injection nozzle 7 with the exhaust means is opened and the air inside the battery case is withdrawn. From electrolyte feeding means 15, a given amount of electrolyte corresponding to the battery is injected into the electrolyte pot via an electrolyte feeding valve 16.

Then, as shown in FIG. 2(B), the exhaust valve 10 and the electrolyte feeding valve 16 are closed, and the electrolyte injection valve 12 is opened. Because the space in the battery case is under reduced pressure, injection of the electrolyte into the battery case is started due to pressure difference between the space inside the battery case and the electrolyte pot 11.

When the injection of the electrolyte in the electrolyte pot 11 is started, the pressure valve coupled to the helium feeding means 17 is opened as shown in FIG. 2(C), and pressure is applied on the electrolyte in the electrolyte pot 11 by helium. Then, the electrolyte is quickly injected into the battery case, and helium is dissolved in the electrolyte and is injected. It is injected into the electrolyte as gas through the electrolyte inlet, and the space inside the battery is filled with helium atmosphere.

When the electrolyte and helium are injected, pressure is applied inside the battery case. Depending on size and type of the battery case, wall surface of the battery case may be swollen and deformed. In this respect, it is preferable to suppress deformation caused by the swelling of the battery case when pressure is applied inside the battery case.

Figure 3:
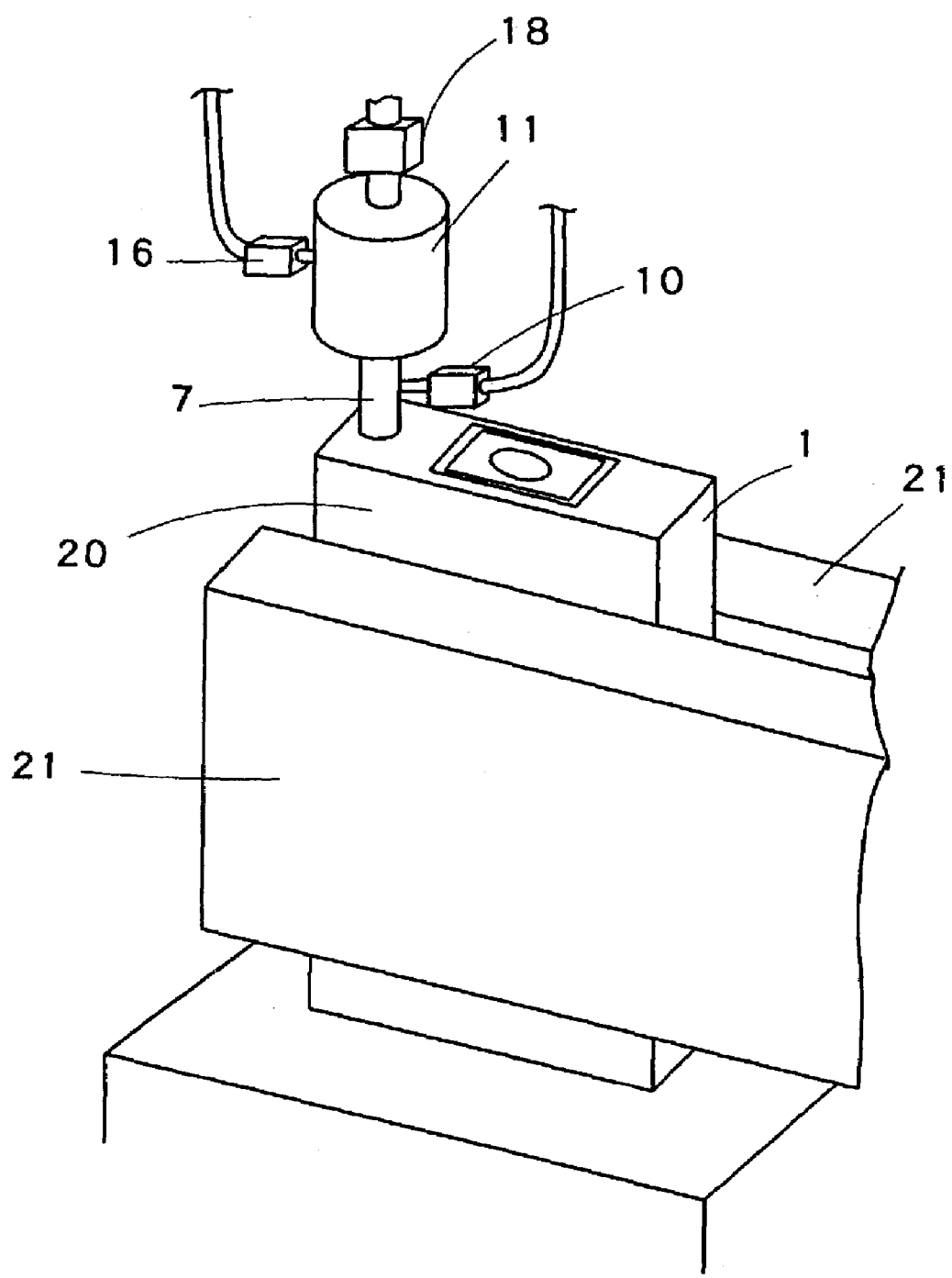
FIG. 3 is a perspective view to explain means for preventing deformation of the battery case.

FIG. 3 is a drawing to explain means for preventing deformation of the battery case.

After the injection of the electrolyte from the electrolyte injection nozzle 7 is started, the pressure valve 18 is opened, and pressure is applied on the electrolyte in the electrolyte pot 11 by helium. By pressurizing means 20, the wall surface 21 of the battery case is pressurized from both sides with the purpose of preventing the deformation of the wall surface 21 of the battery case 1.

The pressure applied on the wall surface of the battery case is a pressure corresponding to the pressure of the electrolyte to be injected into the battery case, and it is preferable to pressurize with pressure equal to the pressurizing force.

The apparatus for injecting electrolyte and helium according to the present invention can be set as desired depending on the type of battery active components, shape and structure of the battery, etc. The exhausting operation in the battery case is performed under pressure of 1.07–1.33 kPa for 5–7 seconds. The degree of the reduced pressure is maintained for about 2 seconds. After confirming that the degree of vacuum is stable and there is no leakage, the exhaust valve is closed, and injection of the electrolyte is started. After 4–10 seconds from the initiation of the injection of the electrolyte, the pressure valve is opened, and pressure is applied by helium. It is preferable that the pressurizing force of helium is set to 0.08–0.20 MPa in gauge pressure.

For example, according to the electrolyte injection apparatus of the present invention, the electrolyte can be injected within 60 seconds through the electrolyte inlet of 1 mm in diameter on a battery in the size of 48×30×6 mm (height× length×width) even in case a viscous nonaqueous electrolyte is used.

Helium may be blended with other types of rare gases or may be blended with nitrogen, carbon dioxide, etc. When the content of gases other than rare gas is increased, leakage detection ability may be decreased. In this respect, it is preferable that the content of the rare gas such as helium is high. Among rare gases, it is preferable to use helium because it has smaller molecules and can easily pass through very small leaking point or fissure.

In the above, description has been given on a method to introduce helium into the battery case at the same time as the injection of the electrolyte using helium as the gas for pressurizing, while it may be designed in such manner that the injection of the electrolyte is performed separately from the injection of helium.

In this case, the injection can be achieved by the methods such as the method to inject helium through injection inlet independently into the battery case after the injection of the electrolyte is terminated, or the method to place the battery case in a sealed chamber after the injection of the electrolyte is placed, and to fill the sealed chamber with helium after the pressure in the space of the sealed chamber is reduced.

Next, description will be given on a method for detecting leakage in a sealed battery containing helium of the present invention.

Figure 4:
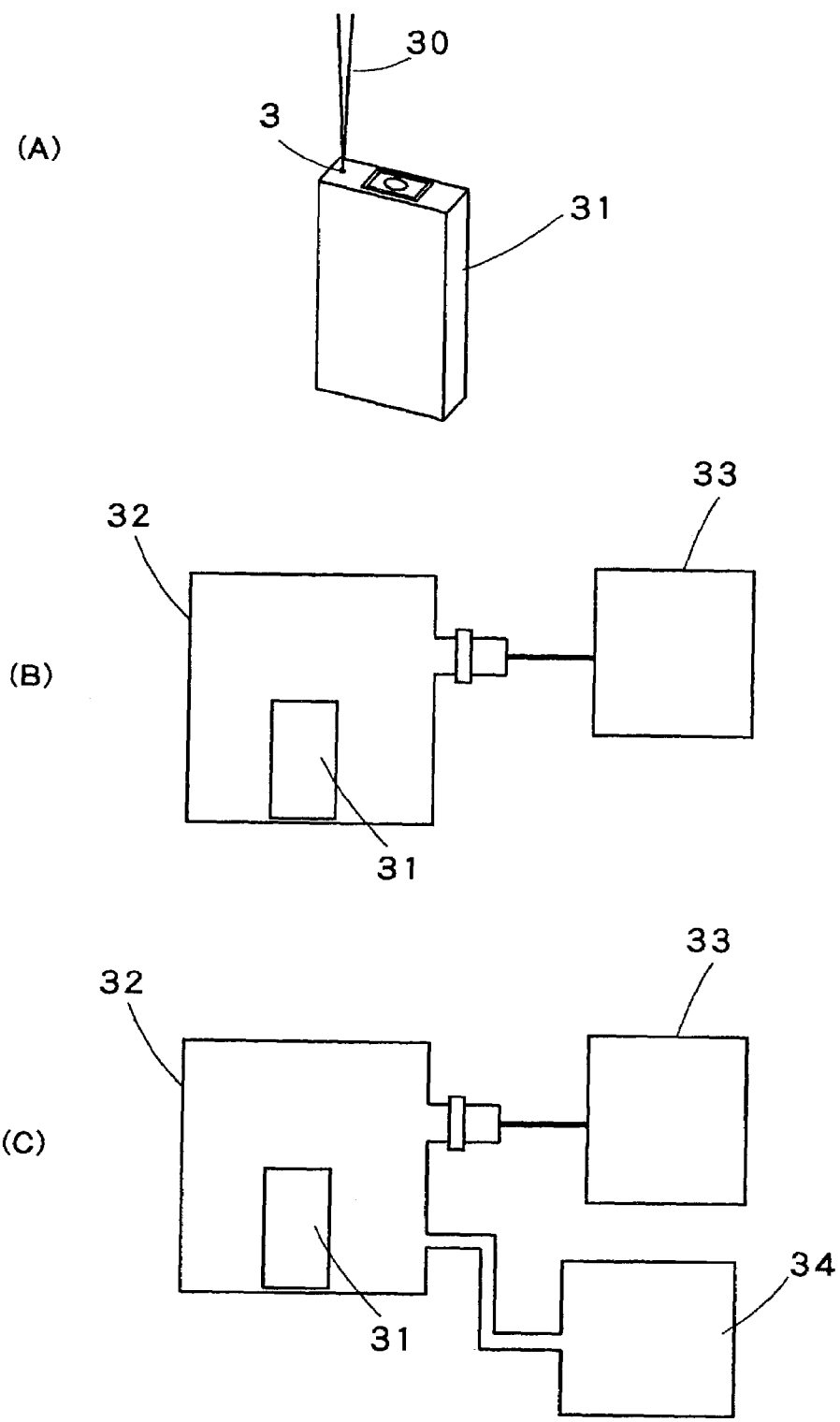
FIG. 4 (a)–(c) shows drawings to explain an example of leakage detecting method.

FIG. 4 shows drawings to explain an example of leakage detecting method.

As shown in FIG. 4(A), the electrolyte inlet 3 on the top cover of the battery case 1 is sealed by laser welding means 30, and a sealed battery 31 is prepared. After initial charging, the sealed battery 31 is placed in a leakage detection chamber 32 as shown in FIG. 4(B). By a helium leakage detector 33, the gas inside the leakage detection chamber 32 is sucked. By determining helium concentration, it is possible to detect whether there is leakage on the battery or not.

Also, as shown in FIG. 4(C), a pressure reducing device 34 is connected to the leakage detection chamber 32, and pressure is reduced in the leakage detection chamber. Thus, the leakage test may be facilitated by increasing the difference of air pressure between inside and outside of the battery case, and by increasing the leaking rate through very small leaking point or fissure.

Figure 5:
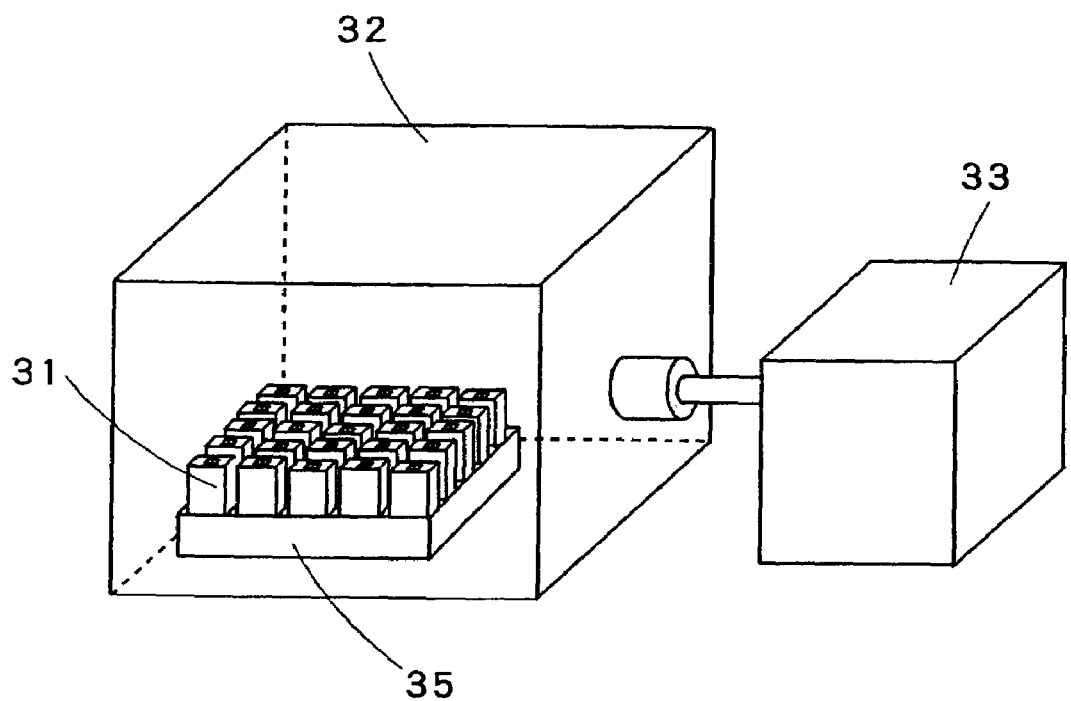
FIG. 5 shows a drawing to explain another example of leakage detecting method.

FIG. 5 is a drawing to explain another example of the leakage detecting method.

In a leakage detection chamber 32, a number of sealed batteries 31 are accommodated on a battery tray 35, and this is placed in the leakage detection chamber 32. By a helium leakage detector 33, the gas in the leakage detection chamber 32 is sucked, and helium concentration is determined. When helium is detected, each of the sealed batteries on the battery tray where leakage is detected is placed in the leakage detection chamber 32 as shown in FIG. 4. By the helium leakage detector 33, the gas in the leakage detection chamber 32 is sucked. By determining helium concentration, the leaking battery can be identified.

Figure 6:
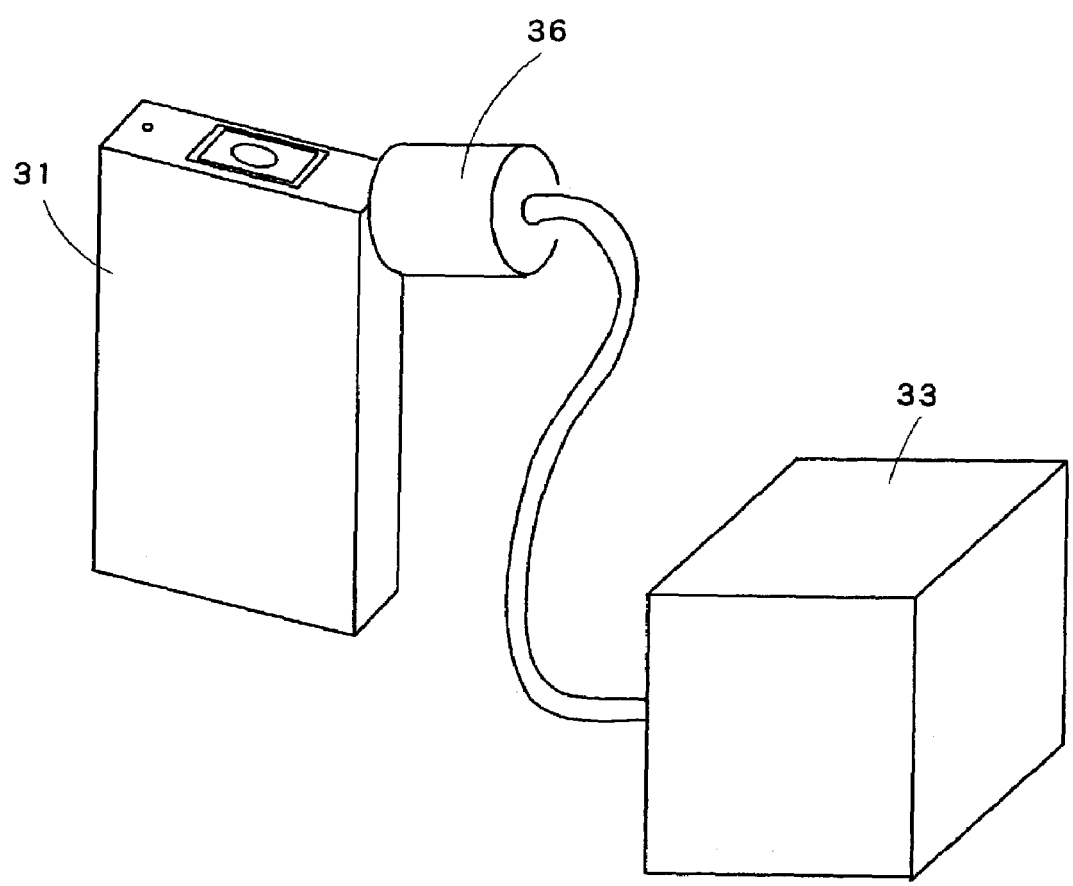
FIG. 6 shows a drawing to explain still another example of leakage detecting method.

FIG. 6 shows still anther example of the leakage detecting method.

A sniffer probe 36 of the helium leakage detector 33 is brought closer to a point on the sealed battery 31 such as welding point where leakage may occur, and it is confirmed whether there is leakage or not.

Figure 7:
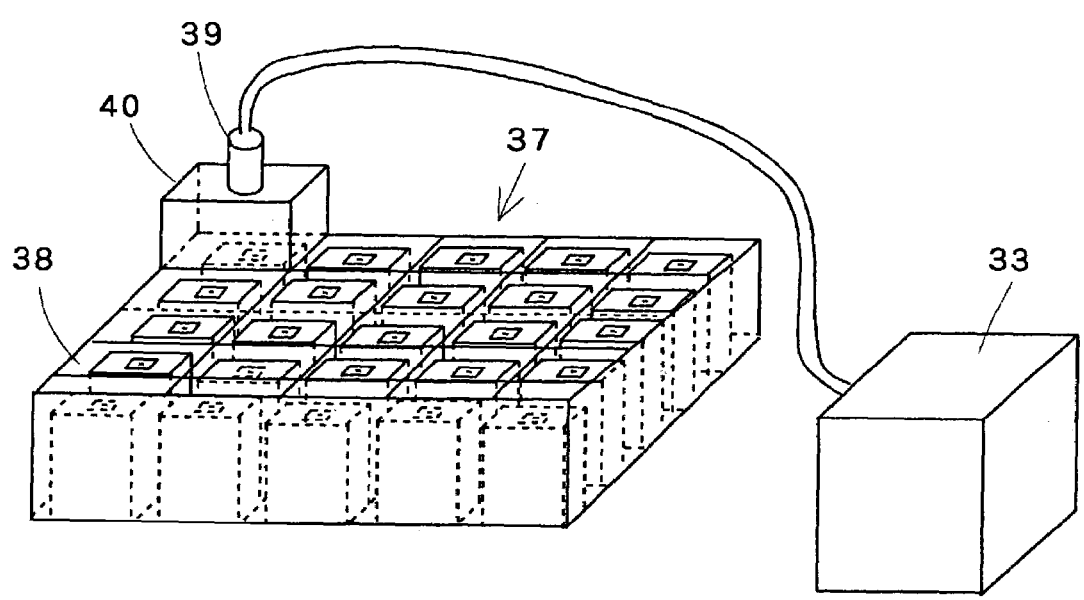
FIG. 7 shows a drawing to explain yet still another example of leakage detecting method.

FIG. 7 is a perspective view to explain yet still another example of the leakage detecting method.

A sealed battery 31 where leakage is to be detected is accommodated in each of a plurality of detection chambers 38 provided on a detection tray 37. A detection head 40 with a leakage detection probe 39 is independently and airtightly provided in each of the detection chambers. By determining helium concentration in each of the detection chambers, it is possible to detect whether there is leakage or not. Measurement may be performed by reducing the pressure in the detection chamber after attaching the detection head.

When the detection head is mounted on transport means, which can be moved to any point in directions of 3 axes of X, Y and Z, and if there is provided means for picking up a battery where leakage is detected, the process for leakage detection can be automatically executed.

The sealed battery containing helium of the present invention may be applied to nonaqueous electrolyte batteries such as lithium ion batteries, or aqueous electrolyte batteries such as batteries using polymer electrolyte, nickel hydrogen batteries, or sealed lead batteries.

In the sealed battery containing helium of the present invention, it is possible to check and measure sealing point of the sealed battery, or leading point of a conductive connecting terminal where leakage may occur, and to detect the leakage by the measuring apparatus in reliable manner and without variation. Further, it is possible to eliminate the possibility of the shipment of defective battery with leaking defect and to increase reliability of the batteries to be delivered.

What is claimed is:

1. A method for detecting leakage in a sealed battery comprising:
    injecting a rare gas into a battery;
    sealing the battery;
    providing a plurality of detection chambers;
    placing the battery inside one of the detection chambers;
    continuously connecting a rare gas leakage detector to each of the detection chambers to measure the concentration; and
    measuring the concentration of the rare gas leaking from the battery using the rare gas leakage detector.

2. A method for detecting leakage in a sealed battery according to claim 1, wherein the rare gas is helium.

3. A method for detecting leakage in a sealed battery according to claim 1, further comprising placing the sealed battery inside a chamber connected to a rare gas leakage detector; the chamber having a reduced pressure.

4. A method for detecting leakage in a sealed battery according to claim 3, wherein the rare gas is helium.

5. A method for detecting leakage of a sealed battery according to claim 1, wherein the rare gas is helium.

* * * * *